United States Patent [19]
Caldwell

[11] 3,744,331
[45] July 10, 1973

[54] DISCONNECT DEVICE
[75] Inventor: Samuel I. Caldwell, Aurora, Ill.
[73] Assignee: Caterpillar Tractor Co., Peoria, Ill.
[22] Filed: Apr. 17, 1972
[21] Appl. No.: 244,413

[52] U.S. Cl. .................................. 74/405, 192/20
[51] Int. Cl. ..................... F16h 57/00, F16d 21/04
[58] Field of Search ............ 74/405; 192/20, 70.19, 192/70.2, 70.22

[56] References Cited
UNITED STATES PATENTS
2,377,575   6/1945   Ringer .............................. 192/20 X
3,518,893   7/1970   Goeke .................................. 74/405

Primary Examiner—Leonard H. Gerin
Attorney—Warren J. Krauss

[57] ABSTRACT

A disconnect device for a power train which has a pair of normally coupled rotary members, including an extension on one of said members which is coupled to, axially movable with, and freely rotatable within a portion of a disconnect rack, and which also includes an adjustable pinion for moving such rack axially so that the rotary member coupled thereto may be selectively positioned out of driving relationship with the other of the members.

24 Claims, 6 Drawing Figures

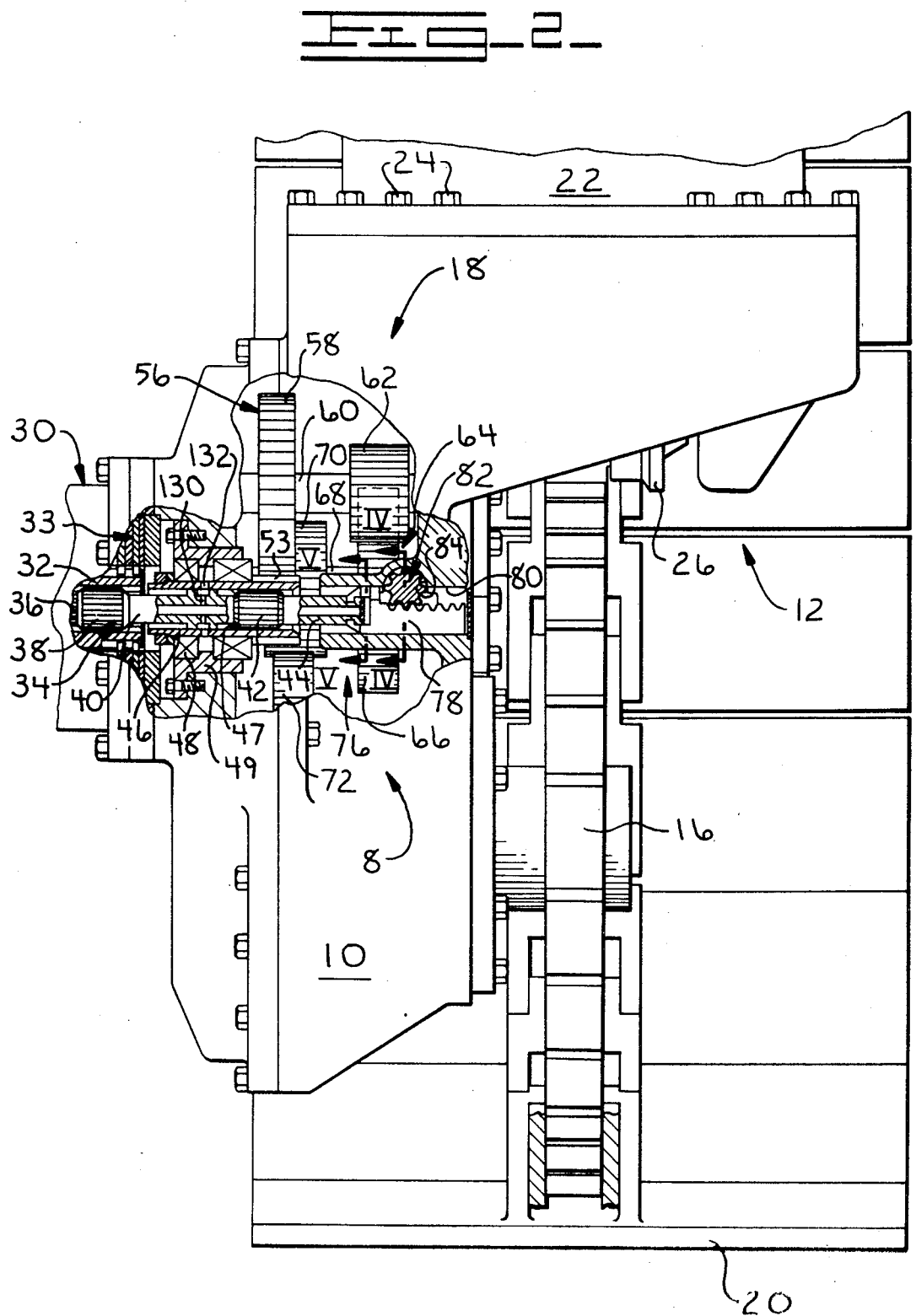

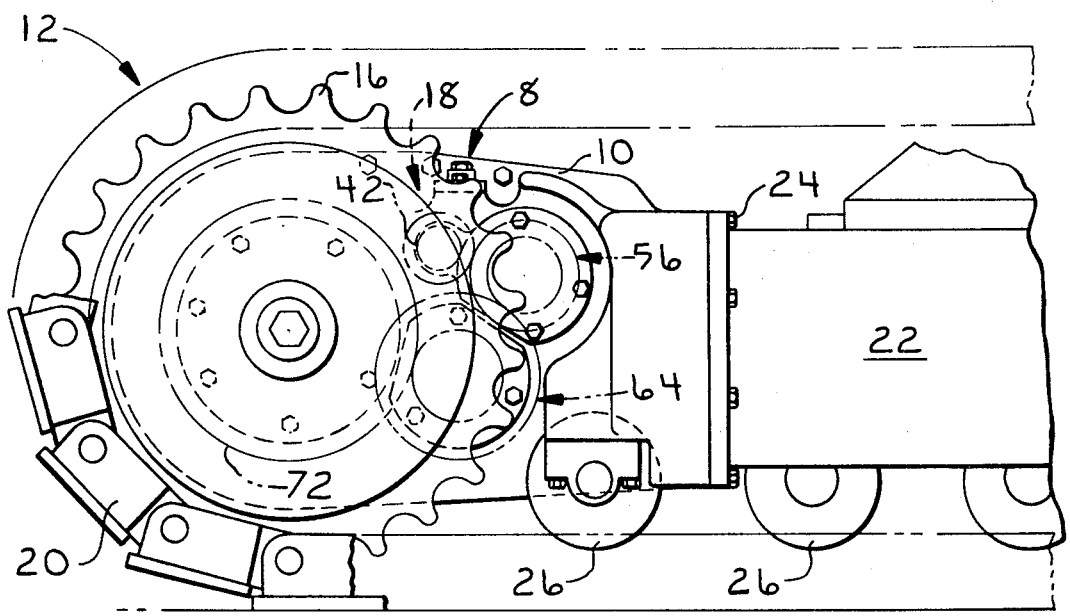
Fig_3_
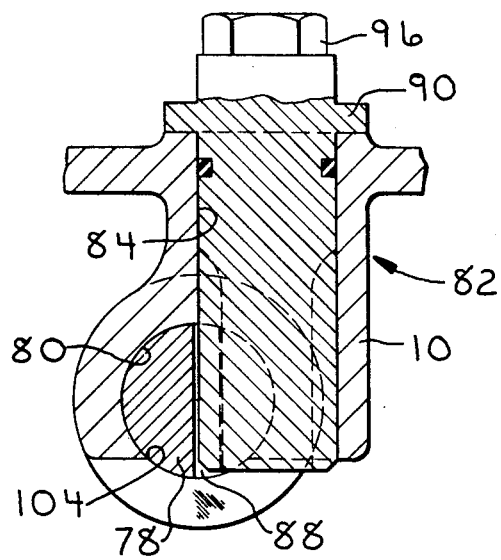
Fig_4_
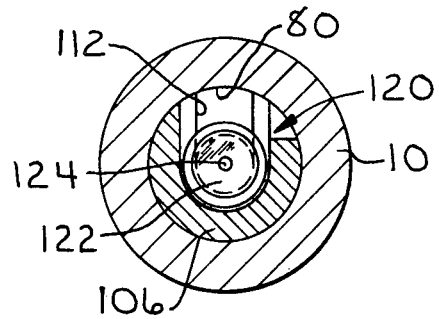
Fig_5_

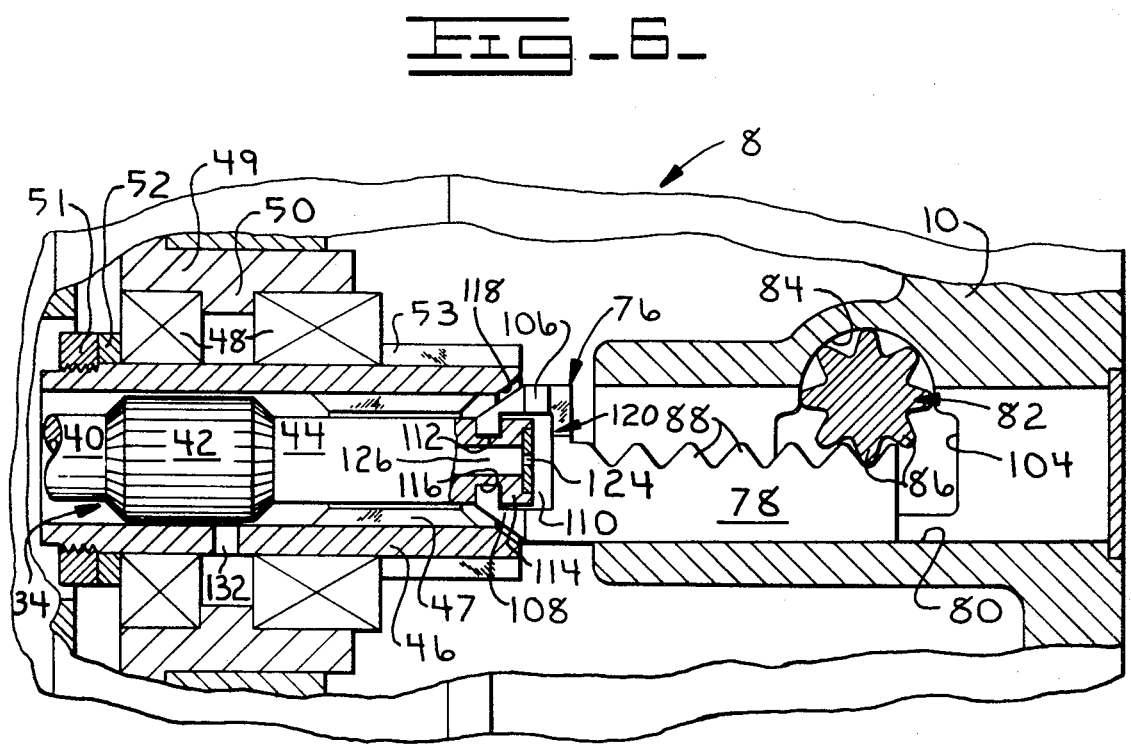
Fig-6-

DISCONNECT DEVICE

BACKGROUND OF THE INVENTION

Vehicles in which failure in the power plant or some other major component occurs must frequently be towed to repair facilities for servicing. At such times, it is usually desirable to have a quick and simple means to disconnect the final drives of such vehicles in order to avoid forcibly turning over an appreciable portion of the gear train with consequent damage thereto during towing.

Turning such gear trains with reverse power and with a "dead" power unit can result in severe damage to the components due to lubricant starvation and friction. This is particularly true of hydrostatically-driven final drive systems. Furthermore, a normally spring force applied and hydraulically released brake unit is commonly integrated with final drive systems for reasons of safety. In such brake-equipped vehicles, failure of the power plant or related auxiliary equipment, such as the hydraulic system, frequently prevents the hydraulic release of the brakes so that special mechanical provisions are required for their release before towing can commence. Thus, there is a need for a disconnect device which is easily accessible for decoupling the final drives of the vehicle as well as the brake mechanisms thereof in order to allow towing for repairs.

A partial solution to the noted problems was offered by the construction disclosed in U.S. Pat. application Ser. No. 211,368, filed on Dec. 23, 1971, by Blomstrom et al., of common assignment herewith. However, in the referenced system, the final drive brake mechanism is disposed with respect to the coupling device such that a separate mechanism must be provided to relieve the brakes independently of the drive train. Further, the disclosed coupling is not bidirectional and requires a spring to reengage the intermeshing teeth thereof.

Other decoupling devices are shown in U.S. Pat. Nos. 3,434,364 to Keese, U.S. Pat. No. 3,504,563 to Polak, and U.S. Pat. No. 3,504,564 to Kell.

U.S. Pat. No. 3,434,364 discloses a selectively operable clutch means which is disengaged by a fluid system and reengaged by a spring and lever arrangement and which is complex and which may become inoperative in the event the fluid system cannot be pressurized due to failure of the power plant.

U.S. Pat. No. 3,504,563 teaches a normally coupled drive train which is disadvantageous because an expensive ball bearing is employed in the system and certain components must be removed and reinstalled during operation, not only adding to uncoupling time but also exposing certain of the parts within the housing to the dirt and other debris.

U.S. Pat. No. 3,504,564 also teaches a decoupling mechanism which utilizes an expensive ball bearing assembly as well as a threaded adjusting rod which is externally disposed and thus exposed to contamination and possible damage with possible consequent inoperativeness. The threaded adjusting device might also be subject to inadvertent movement during operation because the single nut-type lock utilized frequently fails to hold when vehicle vibrations are encountered. Furthermore, U.S. Pat. Nos. 3,504,564 as well as U.S. Pat. No. 3,504,563 include adjusting components which are vulnerably externally exposed outwardly of the final drive in a location subject to frequent bumping in the field.

OBJECTS OF THE INVENTION

It is an object of the present invention to provide a relatively simple means for disconnecting two normally coupled members in a power train so that the output portion of the train may be freely rotated without imparting rotary motion to the power train components on the input side of the disconnect means.

Another object of the invention is to provide a disconnect device for a vehicle final drive which will allow the towing of such vehicle for repairs without imparting rotary movement of the major components of the drive train which are located on the input side of such disconnect device.

Yet another object of the invention is to provide for decoupling of a vehicle final drive from the brakes and motors incorporated therein.

Still another object of this invention is to provide a power train disconnect device which will permit convenient and simple exterior manipulation thereof but which is located in a relatively unvulnerable position which assures protection of the internal components from dirt and damage.

Other objects and advantages of the present invention will become readily apparent upon reference to the accompanying drawings and following description.

BRIEF DESCRIPTION OF THE DRAWINGS

FIG. 2 is an enlarged plan window view of the power train disconnect device of FIG. 1 with certain parts sectioned in a horizontal plane to clearly indicate features of the disconnect device;

FIG. 3 is a side elevation of the undercarriage of FIG. 1 showing the general disposition of the final drive gears and the track-driving sprocket incorporated with the power train disconnect device;

FIG. 4 is an enlarged, fragmentary, vertical section through the adjustable pinion and associated disconnect rack, taken along the line IV—IV of FIG. 2;

FIG. 5 is an enlarged, fragmentary, transverse, vertical section of the disconnect rack taken along the line V—V of FIG. 2 and showing an extension of an input member and the coupling thereof to the disconnect rack; and FIG. 6 is an enlarged, transverse, horizontal section of the disconnect device of FIG. 2, showing the components of the power train disconnect device in disengaged position.

DETAILED DESCRIPTION

Figure 1:
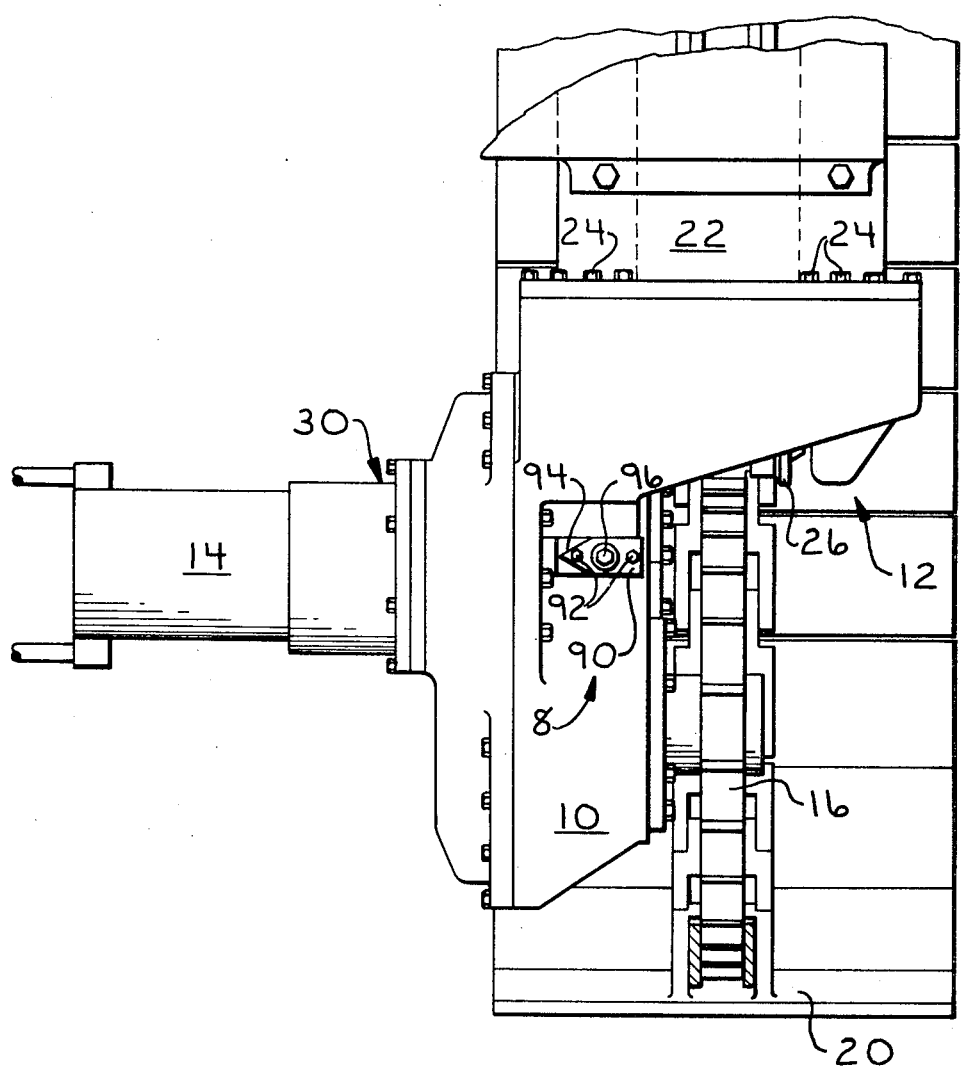
FIG. 1 is a plan view of the rear portion of the tracked undercarriage of an earthmoving vehicle, with the upper portion of a mounted track removed, showing the power train disconnect device of the present invention.

Referring more particularly to the drawings, a power train disconnect device embodying the principles of the present invention is generally indicated by the reference numeral 8. Such a disconnect device is shown, but is not necessarily limited for use, with respect to a final drive housing 10 of the track-type undercarriage 12 of an earthmoving vehicle which includes a hydrostatically driven motor 14 for driving a rear sprocket 16 through a speed reduction gear train shown generally at 18. Rotation of the sprocket causes movement of the associated vehicle (not shown) on the track assembly 20 which assembly is engaged by the teeth of the sprocket in the conventional manner. As shown in FIG. 3, the undercarriage also includes a forwardly-disposed track roller frame 22 which is secured to the final drive housing 10 through a plurality of bolts 24 and supporting track rollers 26.

As shown in FIGS. 1 and 2, a hydrostatic drive motor 14 is disposed inwardly of a disc-type brake means 30 and provides the power input to gear train 18 through rotation of an input sleeve 32. Brake means 30 is the type which is spring engaged and hydraulically disengaged and which includes a plurality of discs 33 which are splined to the outer periphery of input sleeve 32 for holding the input sleeve stationary when engaged. With hydraulic release of the brake means, the input sleeve drives a quill shaft 34 through an internal spline 36 on the input sleeve and an external spline 38 on the inner end portion of the quill shaft. The quill shaft further includes a stem portion 40, a driving input member 42, and an integral extension 44. Under normal driving conditions, driving input member 42 is in mesh with an output member 46 through spline teeth indicated generally at 47.

Output member 46 is rotatably supported by a pair of bearings 48 within a flanged ring member 49 as shown also in FIG. 6. The bearings are separated by a spacing flange 50. Bearings 48 are held adjustably in place upon the member 46 by means of a nut 51 and a washer 52. Output member 46 has a plurality of external teeth 53 which serve as a drive pinion in mating engagement with a first cluster gear means 56 as shown in FIG. 2 which is rotatably supported upon bearings (not shown) disposed within the final drive housing 10. The first cluster gear means includes a large gear 58 in mesh with teeth 53, a stem portion 60, and a small gear 62 which is in turn meshed with a second cluster gear means 64. The similarly supported second cluster gear means includes a large gear 66, a stem portion 68, and a small gear 70. Small gear 70 of the second cluster gear means is in mesh with a large diameter gear 72 which is drivably connected to the sprocket 16 in a conventional manner. The general elevational disposition of the quill shaft 34, the first and second cluster gear means, and the large diameter gear 72 are shown with particular reference to FIG. 3.

As shown in FIGS. 2 and 6, the integral extension 44 of the quill shaft 34 is coupled, as at 76, to a nonrotatable disconnect rack 78 which is disposed in a cylindrical transverse horizontal bore 80 within the final drive housing 10. A depending adjustable pinion, shown generally at 82, is disposed in an intersecting vertical bore 84 within the housing, and a plurality of teeth 86 thereof are in meshing contact with a plurality of teeth 88 of the disconnect rack. As shown in FIG. 6, when the depending pinion 82 is rotated in a clockwise direction, leftward movement of the rack 78 ensues and consequent leftward momvement of the quill shaft extension 44 is achieved such as to disengage the input member 42 from the teeth 47 of the output member 46.

As shown in FIGS. 1 and 4, an upper plate member 90 for the adjustable pinion 82 is securable to the housing 10 by means of a plurality of bolts 92. The plate member includes a pointing indicator surface 94 which indicates the position of the pinion 82. The adjustable pinion further includes an adjusting head member 96, which can be turned with a hand tool or the like.

The enlarged views in FIGS. 5 and 6 disclose details of the construction of coupling means shown at 76. The horizontal bore 80 has a lubricant receiving opening 104 adjacently associated with the coupling means during normal operation of the final drive. The inner or leftward end of disconnect rack 78 includes an upwardly-opening, cylindrical head portion 106, a frustoconical nose portion 108, an upwardly-opening chamber 110, and a U-shaped slot 112 formed in the nose portion. The integral extension 44 of the quill shaft 34 includes an outer cylindrical end portion 114 and a neck portion 116 which is insertable in the rack chamber 110 and engageable with the U-shaped slot 112, respectively, to form the coupling at 76. Assembly of the coupling means is accomplished by sliding the end portion 114 into the chamber 110 and the neck portion 116 into the U-shaped slot 112 transversely to the axis of shaft 34.

To prevent decoupling of the quill shaft 34 and the rack 78 during assembly into the housing 10, an axial force is applied to the quill shaft in a leftwardly direction as viewed in FIG. 6. At such time, the frustoconical nose portion 108 of the rack is received within an internal frustoconical surface 118 of the member 46 in covering relation to the slot 112. This force is maintained to positively interconnect the pair of frustoconical surfaces 108 and 118 until disconnect rack 78 has been rightwardly inserted into the bore 80. The axial force applied to the quill shaft can then be released, since the coupling 76 cannot be disengaged because it is radially constrained by the bore and the ring member 49 can be suitably secured to the housing.

The sectional view of the chamber 110 in FIG. 5 indicates that a lubricant access section of the head portion 106 has been removed as shown at 120, and that an end cap 122, having a centrally-located orifice 124 within the end portion 114, forms the leftward wall of the chamber 110. A central passageway 126 within the quill shaft is in fluid communication with the orifice 124, and a plurality of radial passages 130 and 132 transverse of the passageway 126 allow fluid access to the bearings 48 as shown in FIGS. 2 and 6.

The structure of the present gear train disconnect device also includes a lubrication system which is particularly effective. With reference to FIGS. 2 and 6, it will be noted that the gear train 18 is immersed in oil to a sufficient level within the housing 10 such that cluster gear means 64 throws considerable lubricant onto the rack and pinion areas as well as the coupling at 76 by means of the opening 104 and the bore 80. Oil splashing into the bore 80 enters the upwardly opening chamber 110 at the top, as shown also in FIG. 5, and fills the chamber to a level slightly above the orifice 124. A slight oil pressure head is created in the chamber 110 which is sufficient to cause the lubricating fluid to travel inwardly or leftwardly, as shown in FIG. 6, through the orifice 124 and the central passageway 126 within the quill shaft. Such travel or flow in the passageway 126 is caused by centrifugal force from rotation of the extension 44 acting on the oil contained in the central passageway 126. This is due to the dam formed as a result of the difference in diameters between the orifice 124 and the central passageway. A portion of the oil in passageway 126 is flung radially outwardly through passages 130 and 132 to lubricate the bearings 48. A portion of the oil in the passageway continues leftwardly until it passes out the end of the quill shaft 34 to lubricate the brake means 30 and the splines 36. Thus, this lubrication system assures minimum wear of the associated elements of the coupling means at 76 and also the extended service life of the various mating splines, bearings, and teeth of the drive train.

In order to tow an inoperative vehicle equipped with the present invention, it is necessary to disconnect the gear train 18, as shown in FIG. 2, on the output side of the quill shaft 34. This is because the brake 30 is applied and holding the input sleeve 32 fixed with respect to the housing 10 by virtue of the engagement of discs 33.

As shown in FIGS. 1 and 4, the adjustable pinion 82 is easily accessible for servicing by means of the removal of bolts 92, which bolts secure the plate member 90 to the housing 10. Upon removal of the bolts 92, a wrench is secured to the adjusting head member 96 so that the integrally formed pinion may be rotated 180 degrees in a clockwise direction, as viewed in FIGS. 2 and 6. It should be appreciated that the 180 degree clockwise rotation of the pinion 82 positions the rack 78 inwardly or to the left as shown in FIG. 6 so that the input member 42 is no longer in mesh with the output member 46. This, of course, simultaneously renders inoperative the effect of the brake 30 on the motor 14 on the sprocket 16.

In view of the foregoing, it is readily apparent that the disconnect device of the present invention provides an improved manner in which to decouple a pair of normally coupled rotating members in a power train so that the output portion thereof may be rotated without imparting rotary motion to the remainder of the power train on the input side of the disconnect. It accomplishes this result without exposing internal parts to damage and contamination and in a very simple and positive manual manner. The adjusting means for the disconnect device is disposed in a protected position, and a glance at a built-in indicator surface informs an observer as to the position of the internal components.

While the invention has been described and shown with particular reference to the preferred embodiment, it will be apparent that variations are possible within the spirit of the inventive concepts and no limitation is intended, except by the scope of the appended claims.

What is claimed is:

1. In a power train having a pair of normally coupled movable members, a disconnect device comprising; extension means associated with one of said normally coupled members, disconnect rack means adjacent to and engageable with said extension means, means for coupling said rack means to said extension means to permit relative rotation therebetween while said rack means engages and imparts axial movement to said extension means, and pinion means in meshing contact with said rack means for axially positioning said rack means concurrently with said one member out of coupled relationship with said other of said members.

2. The invention of claim 1 wherein said pinion means is selectively adjustable and includes externally visible indicia means to indicate when said pinion means is disposed in a position which corresponds to a coupled relationship between said pair of members.

3. The invention of claim 1 wherein said disconnect device is disposed within housing means and said adjustable pinion means include an inner pinion carrying end portion and an outer adjustment end portion which protrudes from said housing means to allow external adjustment of said pinion means by means of said adjustment end portion.

4. The invention of claim 3 wherein said outer adjustment end portion includes an integral head member which is manually rotatably adjustable to cause rotation of said pinion carrying end portion and to axially position said rack means and said one member relative to said other of said members.

5. The invention of claim 3 wherein said outer adjustment end portion of said pinion means includes an integral plate means and locking means therefor for securing said plate means to said housing means to selectively lock said pinion means against rotational movement.

6. The invention of claim 5 wherein said plate means functions to indicate whether said pair of members are in coupled or uncoupled relationship.

7. The invention of claim 1 wherein said rack means include head means forming an upwardly opening chamber and wherein a U-shaped slot is formed in said head means connecting said chamber with an end face portion of said head means, and wherein said extension means includes an end portion and a neck portion defined thereon which are respectively insertable into said chamber and said U-shaped slot to form said means for coupling said rack means to said extension means.

8. The invention of claim 7, said head means including a nose portion, and said other of said movable members having socket means for receiving said nose portion therein to selectively hold said other member and said head means in frictional engagement upon the imposition of an axial force thereto, said socket means including means for covering said slot in said head means to preclude removal of said end portion of said extension means from said chamber in the head means when said socket means and said head means are in frictional engagement.

9. The invention of claim 8 wherein said nose portion of the head means and said socket means include correspondingly frustoconical self-centering mating surfaces.

10. The invention of claim 9 wherein said upwardly opening chamber is supplied with lubricating fluid to minimize wear in said means for coupling said rack means and said extension means.

11. The invention of claim 10 wherein said one of said normally coupled movable members and said extension means thereof include a passage therein, said end portion of said extension means includes an orifice therein of a diameter smaller than said passage to communicate said upwardly opening chamber with said passage and centrifugally to trap said lubricating fluid within the passage and cause its axial movement through the passage away from said upwardly opening chamber.

12. In a power train having a normally coupled driving input member and driven output member, a disconnect device comprising; an extension means on said input member, disconnect rack means adjacent to said extension means, coupling means for selectively connecting said rack means to said extension means for relative rotation therebetween and simultaneous concerted axial movement of said extension means and said rack means, and adjustable pinion means in constant engagement with said rack means for axially positioning said rack means to cause movement of said input member out of a driving relationship with said output member.

13. The invention of claim 12 wherein said power train further includes brake means for locking of said input member and wherein said output member is freely rotatable when said rack means has caused said output member to move out of driving relationship with said input member when said brake means is operative.

14. In a disconnect device for a vehicle final drive assembly having a normally meshed input member and output member, the improvement comprising; an extension means on said input member, disconnect rack means axially aligned with said extension means and selectively movable therewith, coupling means for connecting said rack means to said extension means for relative rotation therebetween simultaneous with concerted axial movement, and adjustable pinion means in contact with said rack means for selectively axially positioning said rack means and said input member away from said output member so that said vehicle can be towed without imparting rotary movement to said input member.

15. A disconnect device, for a vehicle final drive having a normally meshed input member and output member contained within a housing, comprising; axial extension means on said input member, bore means in said housing axially aligned with said extension means, disconnect rack means disposed within said bore means, intersecting bore means in said housing transverse of said axially aligned bore means, pinion means disposed in said intersecting bore means in contact with said rack means for axially positioning said rack means, coupling means for connecting said rack means to said extension means to allow axial movement to be transmitted thereto without transmitting rotational movement therebetween, and adjustment means on said pinion means to allow the axial positioning of said rack means, said extension means, and said input member to a nonmeshing relationship with respect to said output member.

16. A disconnect device for selectively uncoupling first and second normally coupled rotatable means comprising; extension means on said first rotatable means, first interengaging means on said first rotatable means, second interengaging means on said second rotatable means, said first and second interengaging means being in mesh when said first and second rotatable means are coupled together, rack means for engaging said extension means and imparting axial movement thereto while permitting said extension means to rotate.

17. The invention of claim 16 wherein said second rotatable means include a hollow member mounted for rotation within a pair of spaced bearing members and wherein said first rotatable means include a first member coaxially disposed within said hollow member.

18. The invention of claim 17 wherein said first and second interengaging means include circumferentially spaced-apart teeth on said first member and said hollow member respectively.

19. The invention of claim 17 wherein said bearing members are adjustably mounted upon said hollow member by threaded means.

20. The invention of claim 18 wherein said rack means include a rack member having an enlarged end means thereon for engaging a portion of said extension means.

21. The invention of claim 20 wherein said enlarged end means include a hollow partially conically shaped member having a centrally disposed flange portion thereon and wherein said extension means include a reduced section neck portion on said first member adapted to engage said centrally disposed flange portion for concerted axial movement therewith.

22. In a power train having a pair of normally coupled rotary members, a disconnect device comprising; extension means associated with one of said rotary members, said extension means including an end portion and a neck portion, member positioning means including an end face portion and a nose portion which define an upwardly opening chamber, a U-shaped slot connecting said upwardly opening chamber with said end face portion, said upwardly opening chamber and said slot being adapted to respectively receive said end portion and said neck portion of said extension means to permit relative rotation between said extension means and said upwardly opening chamber, and actuating means operatively associated with said positioning means for axially moving said one rotary member relative to said other of said rotary members.

23. The invention of claim 22 wherein said other of said rotary members includes socket means for receiving said nose portion of said positioning means, said socket means including means for covering said slot upon the selective imposition of axial force to said one member to preclude removal of said end portion from said upwardly opening chamber.

24. The invention of claim 22 including a source of lubricating fluid, and wherein said one of said rotary members and its extension means include passage means therein, said end portion of said extension means including an orifice therein which communicates with said chamber of said member positioning means whereby fluid in said upwardly opening chamber travels from said chamber through said orifice and through said passage means.

* * * * *